US007331149B2

(12) United States Patent
Tollenaar

(10) Patent No.: US 7,331,149 B2
(45) Date of Patent: *Feb. 19, 2008

(54) DRYWALL BACKING APPARATUS AND METHOD OF INSTALLING SAME

(75) Inventor: Daniel W. Tollenaar, Des Moines, IA (US)

(73) Assignee: Kathy M. Tollenaar, Des Moines, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/693,350

(22) Filed: Oct. 24, 2003

(65) Prior Publication Data

US 2004/0055229 A1 Mar. 25, 2004

Related U.S. Application Data

(63) Continuation of application No. 09/999,874, filed on Oct. 19, 2001, now Pat. No. 6,705,056.

(51) Int. Cl.
*E04C 2/34* (2006.01)
(52) U.S. Cl. .......................... 52/481.1; 52/82; 52/696; 52/690
(58) Field of Classification Search .................. 52/317, 52/696, 690, 712, 481.1, 82
See application file for complete search history.

(56) References Cited

U.S. PATENT DOCUMENTS 1,867,449 A * 7/1932 Ecket et al. ................... 52/100

(Continued)

FOREIGN PATENT DOCUMENTS

JP 6306949 11/1994

(Continued)

OTHER PUBLICATIONS 3 sheets from a website for "Qwik Back, LLC" showing a pre-cut steel stud backing.

*Primary Examiner*—Basil Katcheves
(74) *Attorney, Agent, or Firm*—Sturm & Fix LLP

(57) ABSTRACT

A method and apparatus for installing backing in walls which include a first, second and third upright U-shaped stud. A first backing member has a first end, a second end, a top, a bottom, a first side and a second side. The first backing member is disposed between the first and second studs. A second backing member has a first end, a second end, a top, a bottom, a first side and a second side. The second backing member is disposed between said second and third studs. A hinge is operatively attached to the first side of the first and second backing members for permitting the second backing member to pivot with respect the first backing member between a first position wherein the first side of each of the first and second backing members are substantially in the same plane and a second position whereby the first and second backing members are not in the same plane. This permits the first backing member to be placed between a first and second adjacent vertical stud. Then the second backing member is pivoted with respect to the first backing member. After that, the second backing member is pivoted to a position to be disposed between the second vertical stud and the third stud which is adjacent to said second stud, whereby the second end of the first backing member is adjacent to and on one side of the first stud and the first end of the second backing member is adjacent to and on the other side of the first stud. More than two backing members can be tied together with a hinge if desired.

56 Claims, 5 Drawing Sheets

U.S. PATENT DOCUMENTS

| | | | | |
|---|---|---|---|---|
| 1,924,515 A | * | 8/1933 | Reinke | 52/317 |
| 2,994,114 A | * | 8/1961 | Black | 52/317 |
| 3,527,006 A | * | 9/1970 | Hanson | 52/241 |
| 3,680,271 A | * | 8/1972 | Satchell | 52/656.1 |
| 4,237,669 A | * | 12/1980 | Hunter | 52/417 |
| 4,275,534 A | * | 6/1981 | Porter | 52/82 |
| 4,453,362 A | | 6/1984 | Rodgers | |
| 4,596,101 A | | 6/1986 | Brinker | |
| 4,619,304 A | | 10/1986 | Smith | |
| 4,658,556 A | | 4/1987 | Jenkins | |
| 4,696,132 A | | 9/1987 | LeBlanc | |
| 4,804,094 A | * | 2/1989 | Eittreim | 211/88.01 |
| 4,976,075 A | | 12/1990 | Kaveckis | |
| 5,189,857 A | | 3/1993 | Herren | |
| 5,249,400 A | | 10/1993 | Turner | |
| 5,551,200 A | | 9/1996 | Krug | |
| 5,692,341 A | | 12/1997 | Erlandson | |
| 6,108,990 A | | 8/2000 | Klamer | |
| 6,189,277 B1 | | 2/2001 | Boscamp | |
| 6,253,529 B1 | | 7/2001 | De Boer | |
| 6,260,318 B1 | | 7/2001 | Herren | |
| 6,334,287 B1 | | 1/2002 | Fick | |
| 6,389,762 B2 | | 5/2002 | Le Poire | |
| 6,705,056 B2 | * | 3/2004 | Tollenaar | 52/317 |

FOREIGN PATENT DOCUMENTS

JP  6307022  11/1994

* cited by examiner

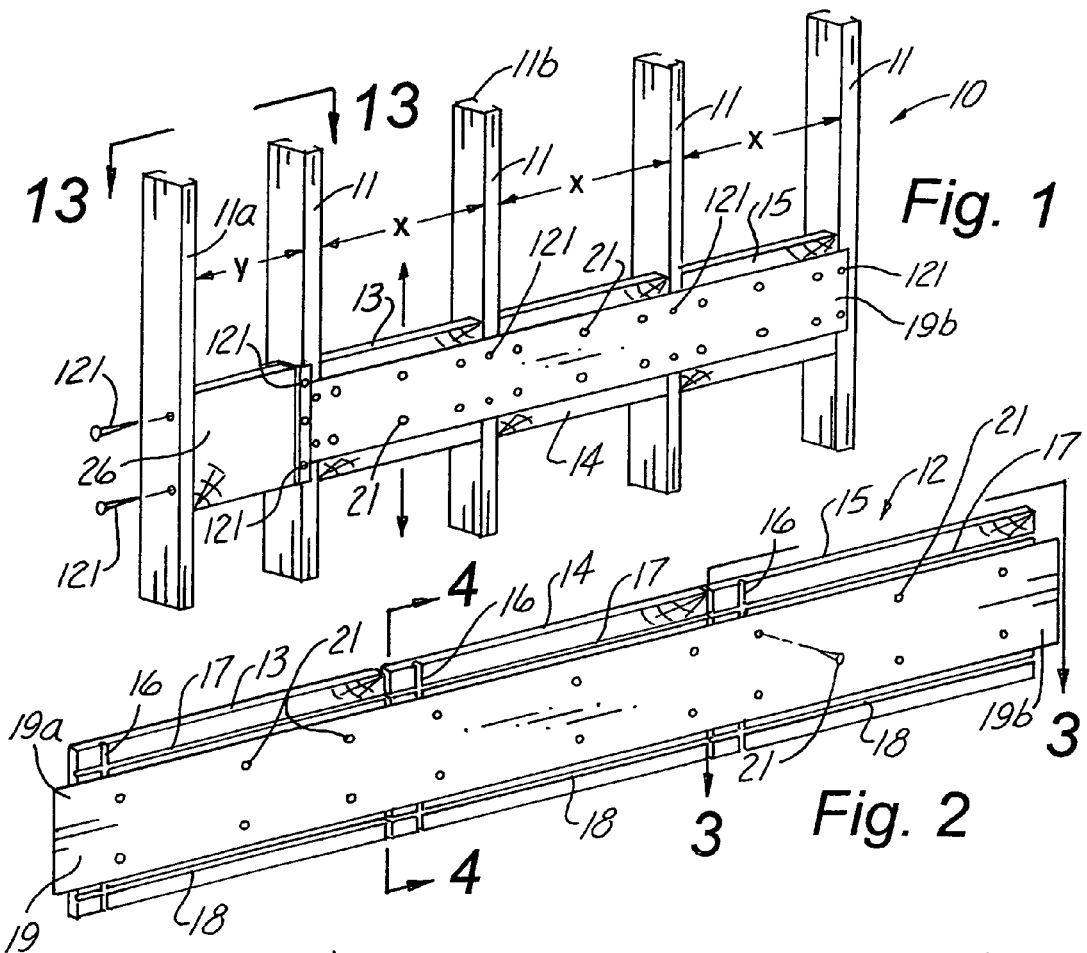
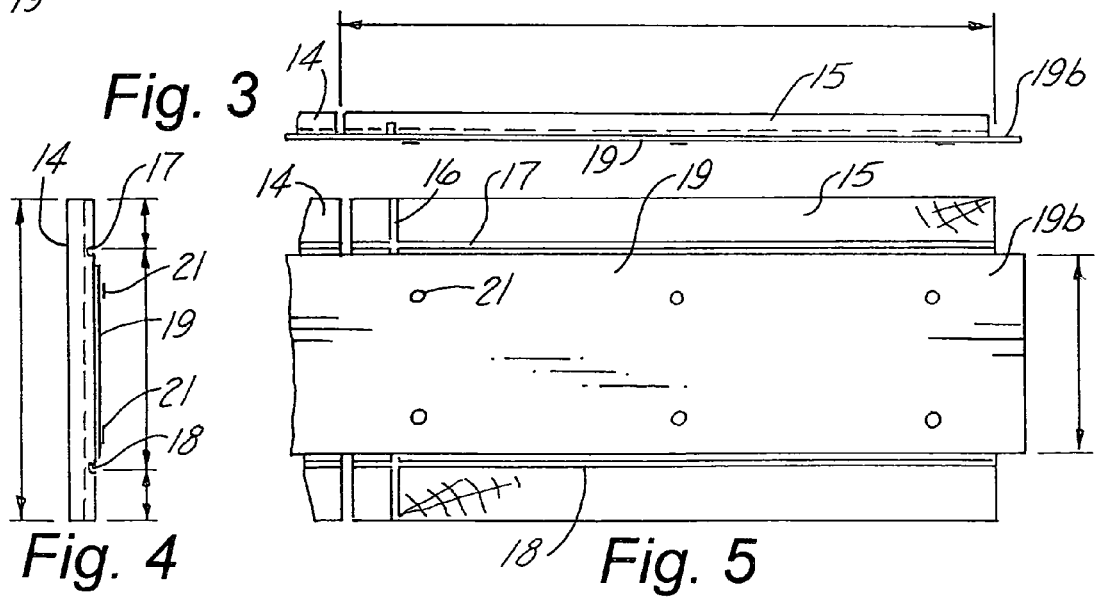

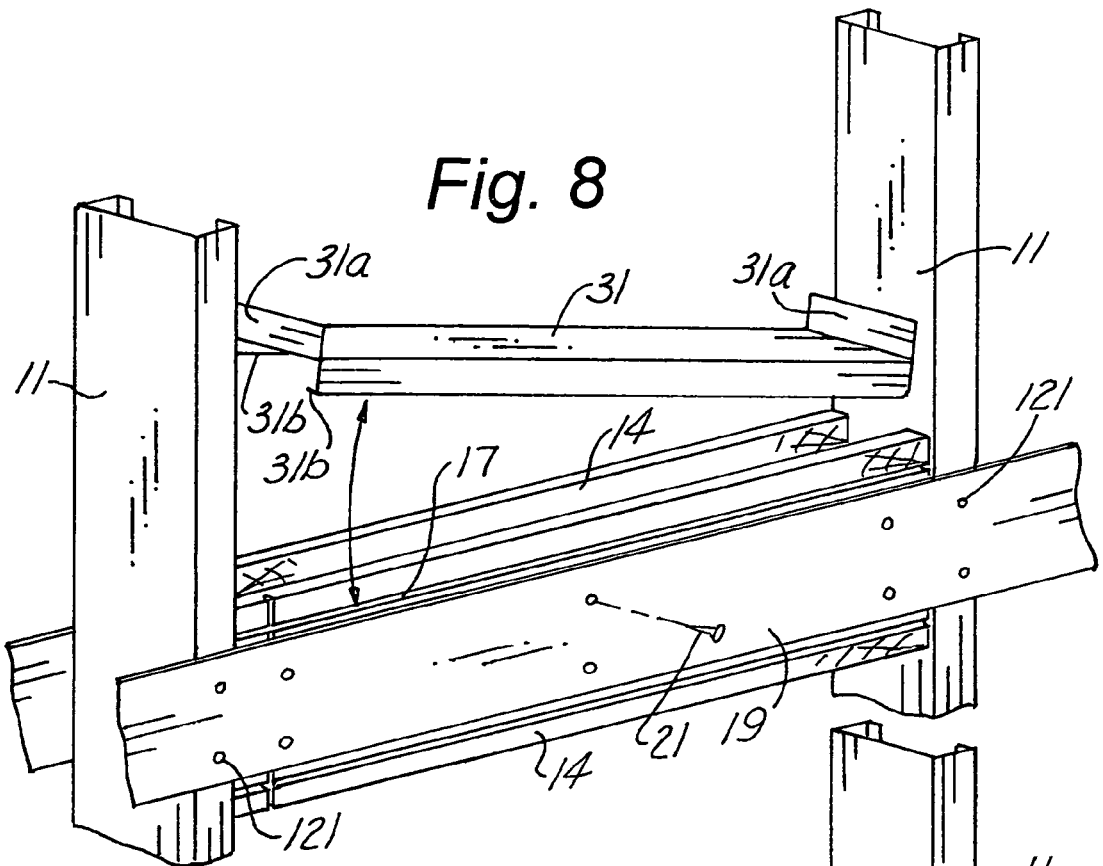
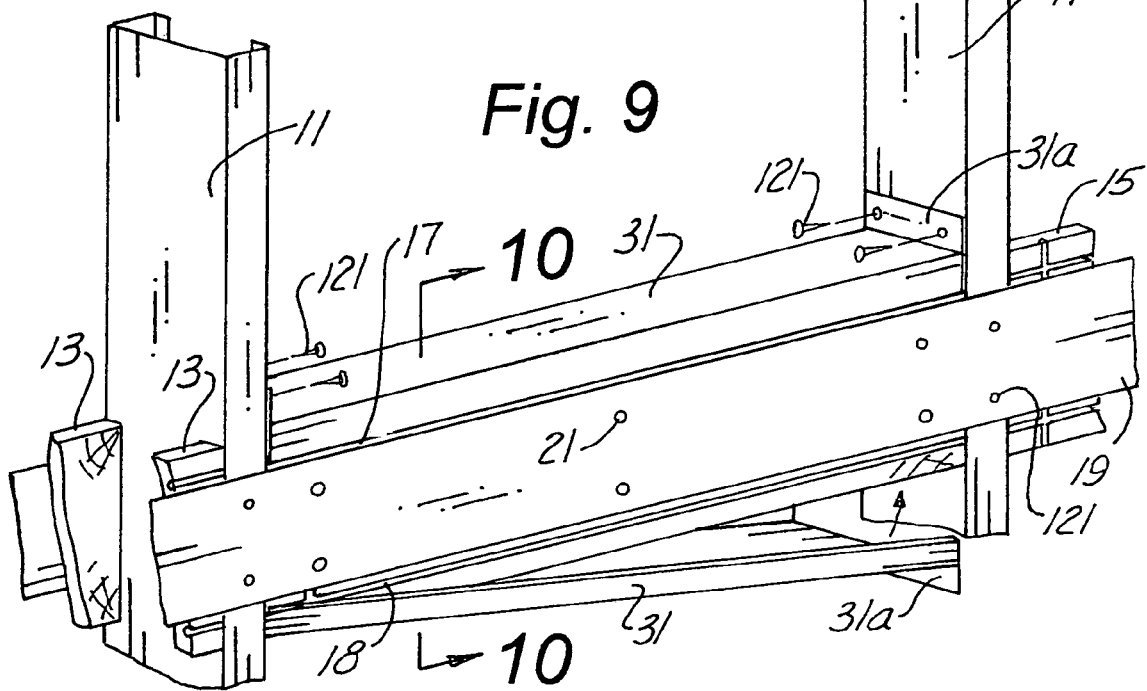

DRYWALL BACKING APPARATUS AND METHOD OF INSTALLING SAME

CROSS REFERENCE TO RELATED APPLICATIONS

This application is a Continuation of U.S. patent application Ser. No. 09/999,874, filed Oct. 19, 2001 now U.S. patent application Ser. No. 6,705,056, entitled DRYWALL BACKING APPARATUS AND METHOD OF INSTALLING SAME.

BACKGROUND OF THE INVENTION

1. Field of the Invention

The present invention relates to wall construction, and more particularly to a method and apparatus for anchoring wall mounted structures such as handrails and grab bars.

2. Description of Prior Art

Historically, the framework of a building wall was formed entirely of wood members, including wooden studs. In recent years at least in the United States, however, the use of metal studs has gained acceptance, especially in commercial buildings, such as office buildings and hospitals. It has been found that metal studs can be advantageously employed, since a suitable metal, such as galvanized steel, is stronger than wood, will not rot, is not subject to damage by pests such as termites, remains resistant to fire, and is economically feasible.

Metal studs are typically formed of sheet metal bent to encompass a cross sectional area having nominal dimensions of two inches by four inches. To conform to architectural plans and building code requirements, metal studs are formed of sheet metal bent into a generally U-shaped cross-section in which a relatively broad central base is flanked by a pair of narrower sides that are bent at right angles to the base. The base typically has a uniform nominal width of either four inches or 3⅝ inches, which is commonly referred to as the web. The sides of the U-shaped stud typically extends to a nominal distance of two inches from the base which are commonly referred to as flanges. To enhance structural rigidity to the flanges of the stud, the flanges are normally bent over into a plane parallel to and spaced from the plane of the web. These turned over edges of the sides thereby form marginal lips which are typically one quarter to one half inch in width. Conventionally, the metal studs are erected with the webs oriented on the same side in the same direction.

In building construction, there are certain situations which require the building studs to be braced or linked transversely to provide enhanced structural rigidity. The studs must be transversely bridged when they are over eight feet in length so that they provide adequate stability in a lateral direction within the wall which they support.

In certain instances, the metal studs require transverse backing between the studs in a building so to provide structural support against forces acting normal to or parallel to the plane of the wall assembly. For example, structural backing must be provided between adjacent parallel studs to provide necessary structural stability for the installation wall structures such as hand rails and grab bars most which conform to requirements of the Americans with Disabilities Act, i.e., withstand 250 pounds of point load pressure outward and downward parallel to the plane of the wall. A common way to provide backing is to shape pieces of plywood between adjacent studs and use screw fasteners to attach these pieces to adjacent studs. The number and placement of backing plywood pieces is determined by how much of the framework needs backing.

The use of fire-stops, bridging and backing in construction trade is well known in the prior art. Construction Codes and Fire Codes requires that these devices be positioned between metal studs to: (1) reinforce uniformly laterally spaced parallel metal studs; (2) discourage the spread of fire, smoke and gases within interior walls; and (3) anchor hand rails and grab bars to metal studs. Typically, sheetrock covers the studs and backing and is attached thereto.

BRIEF SUMMARY OF THE INVENTION

The present invention relates to a method and apparatus for installing backing in walls which include a first, second and third upright U-shaped stud. A first backing member has a first end, a second end, a top, a bottom, a first side and a second side. The first backing member is disposed between the first and second studs. A second backing member has a first end, a second end, a top, a bottom, a first side and a second side. The second backing member is disposed between said second and third studs. A hinge is operatively attached to the first side of the first and second backing members for permitting the second backing member to pivot with respect to the first backing member between a first position wherein the first side of each of the first and second backing members are substantially in the same plane and a second position whereby the first and second backing members are not in the same plane. This permits the first backing member to be placed between a first and second adjacent vertical stud. Then the second backing member is pivoted with respect to the first backing member. After that, the second backing member is pivoted to a position to be disposed between the second vertical stud and the third stud which is adjacent to said second stud, whereby the second end of the first backing member is adjacent to and on one side of the first stud and the first end of the second backing member is adjacent to and on the other side of the first stud. More than two backing members can be tied together with a hinge if desired.

Therefore, an object of the present invention is the provision of an improved dry wall backing apparatus and method of installing same.

Another object is to provide a fire break structure.

Other objects, advantages, and novel features of the present invention will become apparent from the following detailed description of the invention when considered in conjunction with the accompanying drawings.

BRIEF DESCRIPTION OF THE SEVERAL VIEWS OF THE DRAWINGS

FIG. 1 is a partial perspective view of a plurality of metal studs having the present invention attached thereto;

FIG. 2 is a preferred embodiment of the present invention shown in a perspective view;

FIG. 3 is a cross sectional view taken along line 3-3 of FIG. 2;

FIG. 4 is a cross sectional view taken along line 4-4 of FIG. 2;

FIG. 5 is a partial front view of a right side portion of the invention shown in FIG. 2;

FIG. 8 is a partial perspective view showing how a fire break portion is attached;

FIG. 9 is a perspective view showing how a bottom fire break member can also be attached if desired;

DETAILED DESCRIPTION OF THE BEST MODES OF THE INVENTION

Figure 6:
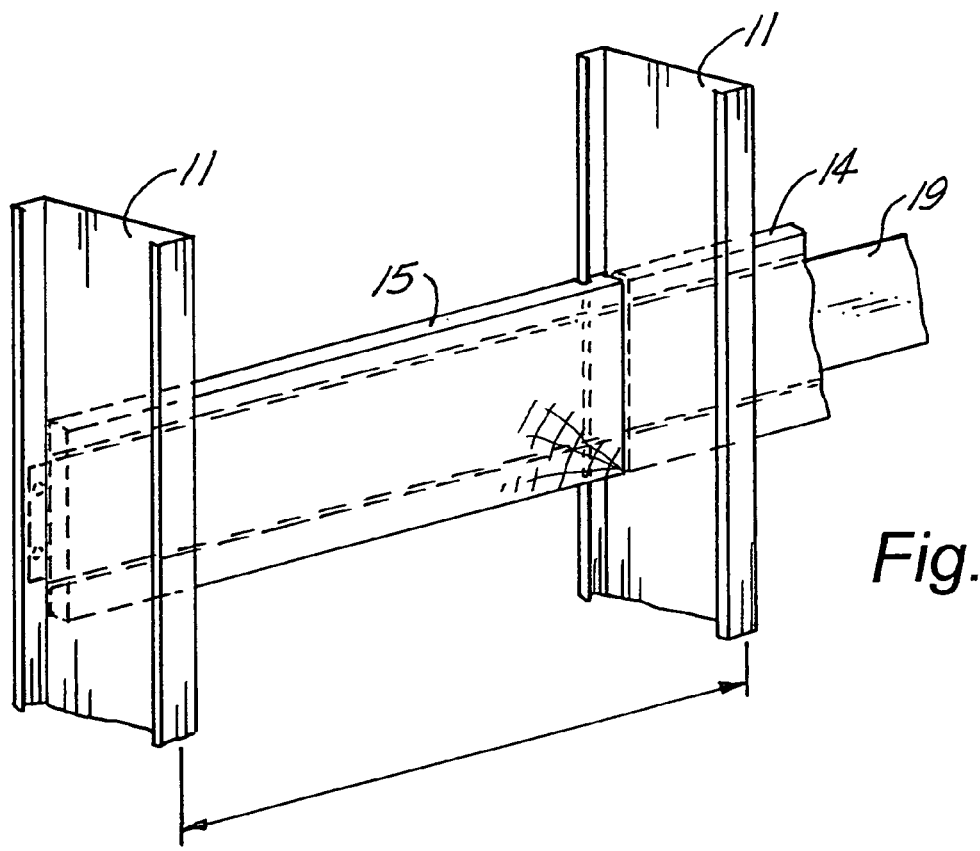
FIG. 6 is a perspective view from the back side of that shown in FIG. 1 in a perspective view.

Referring now to the drawings, wherein like reference numerals designate identical or corresponding parts throughout the several views, FIG. 1 shows the present invention in use as a unit as indicated by the structure (10). Upright metal studs (11) are spaced equally apart and a stud (11a) is spaced a distance (y) which is shorter than the distance (x) that the other studs (11) are spaced from each other. This invention can also be used with studs (11) in ceilings or floors.

Referring to FIG. 2, a backing structure (12) is shown in a preferred embodiment which has three wooden backing members (13), (14) and (15) each having vertical grooves (16) on one end thereof and top and bottom horizontal grooves (17) and (18). A flexible metal hinge (19) is in a preferred embodiment constructed of galvanized sheet metal such as steel but could be any other flexible material. This flexible metal piece (19) serves as a hinge between the first backing member (13) and the second backing member (14) and likewise forms a hinge between the second backing member (14) and the third backing member (15). This hinge (19) could also be any kind of a hinge, for example, between the first backing member (13) and the second backing member (14) and does not need to be a one-piece member with a hinge between the second backing member (14) and the third backing member (15). It is, however, advantageous to have piece (19) extend from beyond the left side of backing member (13) to the right side of the third backing member (15) as shown in FIG. 2 because, not only does it then serve as a double hinge, but also the protruding edges on both ends thereof can easily be attached to the studs (11) as will be described below. The backing members (13), (14) and (15) in this preferred embodiment are constructed of plywood, but they could be a solid piece of wood or any other suitable material useful as a backing member. Screws (21) are used to attach the sheet metal member (19) to each of the backing members (13), (14) and (15), but other ways of attaching the hinge (19) to the backing members (13), (14) or (15) would be fully equivalent thereto.

Figure 7:
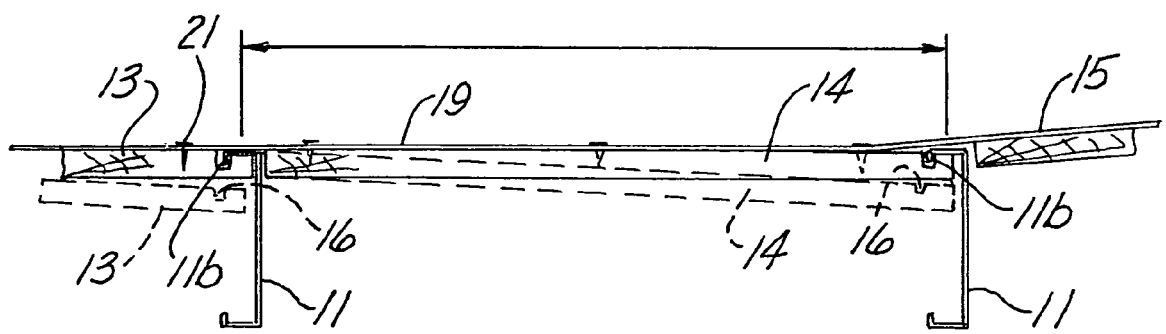
FIG. 7 is a top view showing how the invention is placed onto a pair of metal U-shaped studs.

Referring now to FIGS. 1, 6 and 7, it will be appreciated how easily the apparatus (12) can be attached to the studs (11). For example, as shown in FIG. 7, the first backing member (13) can be easily placed from the dashed line view to the solid line view by pivoting the hinge (19) at approximately the place where the attaching screws (21) are on the left side of FIG. 7. This will allow the vertical groove (16) to go around a flange (11b) in stud (11).

The next step is to pivot the hinge (19) so that the second backing member (14) moves from the position shown in dashed lines in FIG. 7 to the position shown in solid lines in FIG. 7 wherein the vertical groove (16) will be moved over the flange extension (11b) of stud (11), the left stud (11) being the second stud and the right stud in FIG. 7 being the third stud of the four studs shown in FIG. 1 as stud (11).

After the first backing member (13) and the second backing member (14) are in the position shown in solid lines in FIG. 7, then the third backing member (15) is pivoted from the solid line position shown in FIG. 7 to the solid line position shown in FIG. 1. Fasteners (121) are like screws (21). Fasteners (121) attach the end portion (19a) and (19b) of the hinge (19) to the studs (11) over which they lie. After that has been done, screws (121) are also attached through middle portions of the hinge (19) to respective studs (11) as is clearly shown in FIG. 1. It will therefore be appreciated that this is much quicker and forms a more solid unit than merely trying to fasten the wood backing members (13), (14) and (15) individually to studs (11) without use of the sheet metal hinge (19).

Figure 13:
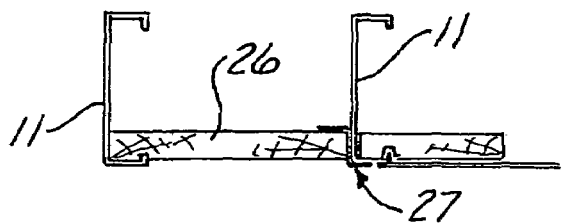
FIG. 13 is a cross sectional view taken along line 13-13 of FIG. 1 showing another aspect of the present invention which is a backing member with a flange on one end thereof for quick attachment to adjacent studs and which can be used on the corners where the studs may not be a standard sixteen inches apart.
Figure 14:
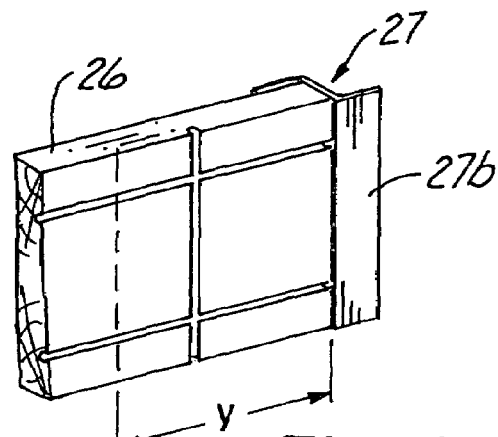
FIG. 14 is a perspective view showing the invention of FIG. 13.
Figure 15:
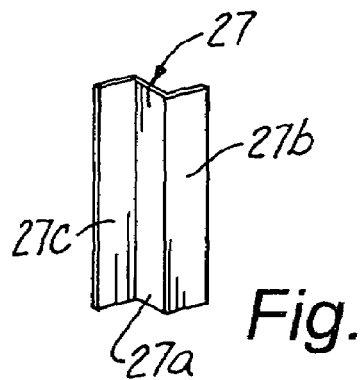
FIG. 15 is a perspective view of the flange which is attached to a wooden member of FIG. 13.

Typically, on the corners of a structure, the stud (11a) shown in FIG. 1 is a distance (y) which is less than the standard distance (x) between the other studs (11) in the wall except for the opposite corner. In order to facilitate quick and easy backing, a backing member (26) made preferably of wood, but which can be made of other materials, has a flange member (27) attached to one end thereof as shown in FIGS. 13, 14 and 15. Screws (121) extend through the end of the wood in center portion (27a) of flange (27) and then screws (121), also extend through flange portion (27b) and into the first stud (11) shown in FIG. 1. FIG. 14 shows vertical and horizontal grooves in the front face, but these are strictly optional in this end piece option (26).

Figure 16:
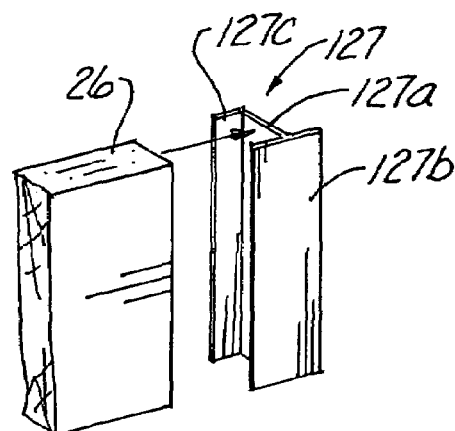
FIG. 16 is an alternate form of the flange and showing how a piece of wood can be received in a depression therein.

Alternatively, a member (127) as shown in FIG. 16 can be used to receive the end of wooden piece (26) and is fully equivalent to the structure shown in FIGS. 13-15. Member (127) has flanges (127a), (127b) and (127c). Also, these structures shown in FIGS. 13-16 can be used independently of the invention shown in FIG. 2 and is a quicker and more economical solution, especially from a labor standpoint, than merely attaching wooden pieces as backing members as in the prior art without the flanges (27) and (127).

Referring now to FIG. 8, a fire break member (31) is cut from a piece of stud, like studs (11) shown in FIG. 1. The ends (31a) can be folded up if desired and although this is a preferred embodiment, the fire break (31) would not have to extend the entire distance if it were merely used as a support member. But it works better as both a support member and a fire break in the preferred embodiment shown in FIGS. 8 and 9. The flange (31b) extends into the horizontal groove (17) of the second backing member (17) as shown in FIG. 8 and a flange (31b) on the other side will extend into a similar groove (17) in a rear second backing member (14) as well. These flanges (31b) can be separated slightly and they are naturally biased into the groove (17) to form an extremely strong structure in conjunction with backing members (14) and studs (11). The end flanges (31a) can also be attached by screws (121) to the studs (11) which further strengthens the entire structure.

If desired, this entire structure can be further strengthened by adding a second fire break member (31) on the bottom side as shown in FIG. 9, which would be attached just like the member (31) on the top, shown in FIG. 8. When constructed like the preferred embodiment shown in FIGS. 8 and 9, it forms a combination backing structure fire break and structural component which is unsurpassed by anything in the prior art. It can also be constructed quicker and more economically than anything heretofore available.

Figure 10:
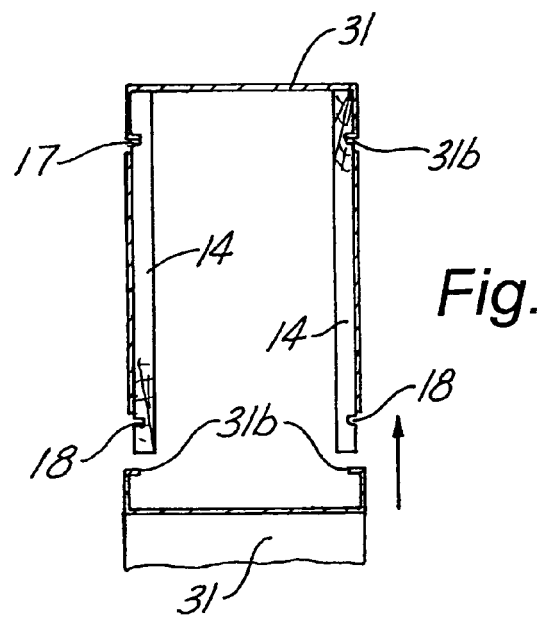
FIG. 10 is a cross sectional view taken along line 10-10 of FIG. 9.

Referring now to FIG. 10, a cross sectional view, along lines 10-10 of FIG. 9 illustrate the structural components and how they interlock and support each other.

Figure 11:
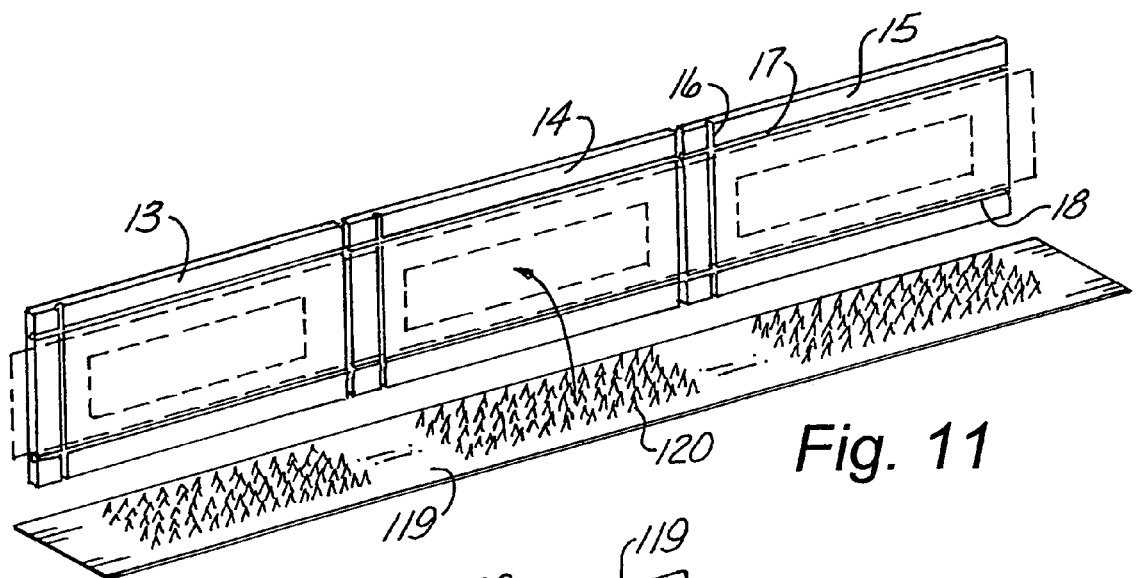
FIG. 11 shows an alternate view of the present invention showing projections formed in a sheet metal hinge to attach to wooden pieces by pushing the projections into the wood.
Figure 12:
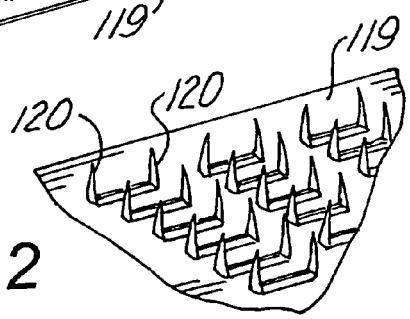
FIG. 12 is an enlarged prospective view of the projections shown in FIG. 11.

Referring to FIGS. 11 and 12, an alternate form of the one-piece hinge (119) is shown having a plurality of metal projections (120) to permit the hinge (19) to be placed in the position shown in dashed lines in FIG. 11 and then pressed into the backing members (13), (14) and (15). This structure is fully equivalent to using the screws (21) shown in FIG. 2. These projections (120) are similar to the projections in prior art plates used to construct trusses or the like.

Accordingly, it will be appreciated that the preferred embodiment does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. An apparatus for providing backing for U-shaped studs in a wall, said backing apparatus comprising:
   a first backing member having a longitudinal axis, a first end, a second end, a top, a bottom, a first side and a second side, the front side being disposed substantially in a first plane;
   a second backing member having a longitudinal axis, a first end, a second end, a top, a bottom, a first side and a second side; wherein, the second end of the first backing member is longitudinally spaced from the first end of the second backing member, the front side of the second backing member being disposed substantially in said first plane;
   a hinge operatively attached to said first side of said first and second backing members for permitting said second backing member to pivot with respect to the first backing member between a first position wherein the longitudinal axes of said first and second backing members are aligned in the same plane and a second position whereby the longitudinal axes of the first and second backing members are not aligned in the same plane, whereby said first backing member can be placed between a first and second adjacent upright U-shaped stud, the second backing member pivoted with respect to the first backing member to the second position, and then pivoting said second backing member to the first position thereof to be disposed between said second upright U-shaped stud and a third upright U-shaped stud whereby said second end of said first backing member is adjacent to and on one side of the second upright U-shaped stud and the first end of the second backing member is adjacent to and on the other side of said second upright U-shaped stud; and
   said second backing member having a vertical groove in said first side thereof for receiving a flange of the second upright U-shaped stud, said groove being at least partially covered by said hinge when the first and second backing members are in the first position thereof.

2. The apparatus of claim 1 including:
   a third backing member having a longitudinal axis, a first end, a second end, a top, a bottom, a first side and a second side;
   said third backing member having a vertical groove in the first side thereof for receiving a flange of a U-shaped stud, said groove being at least partially covered by said hinge when the second and third backing members are in a first position thereof; and
   a second hinge operatively attached to said first side of said second and third backing members for permitting said third backing member to pivot with respect the second backing member between the first position of the second and third backing members wherein the longitudinal axes of said second and third backing members are substantially in the same plane and a second position whereby the longitudinal axes of the second and third backing members are not in the same plane, whereby said second backing member can be placed between said second and third adjacent upright U-shaped studs, the third backing member pivoted with respect to the second backing member to the second position, and then pivoting said third backing member to the first position thereof to be disposed between said third upright U-shaped stud and a fourth upright U-shaped stud closer to said third upright U-shaped stud than to said second upright U-shaped stud, whereby said second end of said second backing member is adjacent to and on one side of the third upright U-shaped stud and the first end of the third backing member is adjacent to and on the other side of said third upright U-shaped stud.

3. The apparatus of claim 2,
   wherein said first, second and third upright U-shaped studs are equidistantly spaced from adjacent studs and an additional upright U-shaped stud that is not spaced equidistantly from one of the first and third upright U-shaped studs; and
   a corner wall backing member having a first end, a second end, a top, a bottom, a first side and a second side, and wherein the first side is disposed in a plane and wherein said corner wall backing member is disposed between said first and additional studs, a flange operatively attached to and extending in a plane substantially the same as or parallel to the plane of the first side of the backing member, said flange being attached to said first upright U-shaped stud and said first end of said backing member being attached to said additional U-shaped stud.

4. The apparatus of claim 1 wherein said first backing member has a vertical groove in said first side thereof adjacent the first end thereof whereby a flange of an upright U-shaped stud can extend therein.

5. The apparatus of claim 4 including a top horizontal member extending between said first and second upright U-shaped studs and on top of said first backing member, said horizontal member having a cross-section like one of said studs including a pair of flanges and wherein said first backing member has a horizontal groove in said first side thereof adjacent the top thereof whereby a flange of said horizontal member can extend therein.

6. The apparatus of claim 1 including a top horizontal member extending between said first and second upright U-shaped studs and on top of said first backing member, said horizontal member having a cross-section like one of said studs including a pair of flanges and wherein said first backing member has a horizontal groove in the first side thereof adjacent the top and a bottom horizontal groove in the first side adjacent the bottom thereof whereby a flange of a bottom horizontal member can extend therein.

7. The apparatus of claim 6 including a backside backing member substantially identical to said first backing member, said backside backing member being disposed between said first and second upright U-shaped studs and one flange of said top horizontal member extends into the horizontal groove adjacent the top of the first backing member and the other flange of said top horizontal member extends into the horizontal groove adjacent the top of the backside backing member.

8. The apparatus of claim 7 including a bottom horizontal member substantially like the top horizontal member but inverted and wherein a flange of said bottom horizontal member extends into the bottom horizontal groove adjacent the bottom of the first backing member and another flange of said horizontal member extends into the horizontal groove adjacent the bottom of the backside backing member.

9. The apparatus of claim 7 wherein said horizontal member comprises a fire resistant material for creating a fire break.

10. The apparatus of claim 9 wherein said horizontal member and said studs are made of metal.

11. The apparatus of claim 10 wherein said metal is galvanized steel.

12. The apparatus of claim 1 wherein said hinge is comprised of a flexible sheet.

13. The apparatus of claim 12 wherein said sheet is comprised of metal.

14. The apparatus of claim 1 wherein said hinge is comprised of a flexible metal sheet having projections therein extending into said backing members for holding the flexible sheet metal hinge attached to said first and second backing members.

15. The apparatus of claim 1 wherein said backing members are constructed of wood.

16. The apparatus of claim 1 wherein sheet rock is attached to said upright U-shaped studs adjacent to said first side thereof of the backing members, thereby covering said studs and said backing members.

17. An apparatus comprising:
a first upright U-shaped stud;
a second upright U-shaped stud to one side of and spaced from said first U-shaped stud;
a third upright U-shaped stud to one side of and spaced from said first and said second U-shaped stud;
a first backing member having a first end, a second end, a top, a bottom, a first side and a second side, said first backing member being disposed between said first and second studs;
a second backing member having a first end, a second end, a top, a bottom, a first side and a second side, said second backing member being disposed between said second and third studs;
a hinge operatively attached to said first side of said first and second backing members for permitting said second backing member to pivot with respect to the first backing member between a first position wherein the first side of each of said first and second backing members are substantially in the same plane and a second position whereby the first and second backing members are not in the same plane, whereby said first backing member can be placed between the first and second adjacent upright U-shaped stud, the second backing member pivoted with respect to the first backing member, and then pivoting said second backing member to a position to be disposed between said second stud and said third stud adjacent to said second stud whereby said second end of said first backing member is adjacent to and on one side of the second stud and the first end of the second backing member is adjacent to and on the other side of said second stud.

18. The apparatus of claim 17 including:
a third backing member having a first end, a second end, a top, a bottom, a first side and a second side;
said third backing member having a vertical groove in the first side thereof for receiving a flange of a U-shaped stud, said groove being at least partially covered by said hinge when the second and third backing members are in a first position thereof; and
a second hinge operatively attached to said first side of said second and third backing members for permitting said third backing member to pivot with respect to the second backing member between the first position of the second and third backing members wherein the first side of each of said second and third backing members are substantially in the same plane and a second position whereby the second and third backing members are not in the same plane, whereby said second backing member can be placed between said second and third adjacent upright U-shaped studs, the third backing member pivoted with respect to the second backing member to the second position, and then pivoting said third backing member to the first position thereof to be disposed between said third upright U-shaped stud and a fourth upright U-shaped stud closer to said third upright U-shaped stud than to said second upright U-shaped stud, whereby said second end of said second backing member is adjacent to and on one side of the third upright U-shaped stud and the first end of the third backing member is adjacent to and on the other side of said third upright U-shaped stud.

19. The apparatus of claim 18 including a top horizontal member extending between said first and second upright U-shaped studs and on top of said first backing member, said horizontal member having a cross-section like one of said studs including a pair of flanges and wherein said first backing member has a horizontal groove in said first side thereof whereby a flange of said horizontal member can extend therein.

20. The apparatus of claim 18 wherein the first hinge and the second hinge are formed of one piece of flexible sheet metal which extends across said first, second and third backing members.

21. The apparatus of claim 20 including a fourth stud and wherein said flexible sheet of metal extends beyond from said first stud to said fourth stud whereby said flexible sheet can be attached to said first, second, third and fourth studs.

22. The apparatus of claim 17 wherein said second backing member has a vertical groove in said first side thereof adjacent the first end thereof whereby a flange of an upright U-shaped stud can extend therein.

23. The apparatus of claim 17 wherein said first backing member has a vertical groove in said first side thereof adjacent the first end thereof whereby a flange of an upright U-shaped stud can extend therein.

24. The apparatus of claim 17 including a top horizontal member extending between said first and second upright U-shaped studs and on top of said first backing member, said horizontal member having a cross-section like one of said studs including a pair of flanges and wherein said first backing member has a horizontal groove in the first side thereof adjacent the top thereof and a bottom horizontal groove in the first side adjacent the bottom thereof whereby a flange of a bottom horizontal member can extend therein.

25. The apparatus of claim 24 including a backside backing member substantially identical to said first backing member, said backside backing member being disposed between said first and second upright U-shaped studs and one flange of said top horizontal member extends into the horizontal groove adjacent the top of the first backing member and the other flange of said top horizontal member extends into the horizontal groove adjacent the top of the backside backing member.

26. The apparatus of claim 25 including a bottom horizontal member substantially like the top horizontal member but inverted and wherein a flange of said bottom horizontal member extends into the horizontal groove adjacent the bottom of the first backing member and another flange of said horizontal member extends into the horizontal groove adjacent the bottom of the backside backing member.

27. The apparatus of claim 25 wherein said horizontal member comprises a fire resistant material for creating a fire break.

28. The apparatus of claim 27 wherein said horizontal member and said studs are made of metal.

29. The apparatus of claim 28 wherein said metal is galvanized steel.

30. The apparatus of claim 29 wherein sheet rock is attached to said studs and covers said backing members.

31. The apparatus of claim 17 wherein said hinge is comprised of a flexible sheet.

32. The apparatus of claim 31 wherein said sheet is comprised of metal.

33. The apparatus of claim 17 wherein said hinge is comprised of a flexible metal sheet having projections therein extending into said backing members for holding the flexible sheet metal hinge attached to said first and second backing members.

34. The apparatus of claim 33 wherein said backing members are constructed of wood.

35. The apparatus of claim 17 wherein sheet rock is attached to said upright U-shaped studs adjacent to said first side thereof of the backing members thereby covering said studs and said backing members.

36. An apparatus for providing backing for studs in a wall, said apparatus comprising:
a first backing member having a first end and a second end, a front side and a back side, the front side being disposed substantially in a first plane;
a second backing member having a first end and a second end, a front side and a back side, the front side of the second backing member being disposed substantially in said first plane;
a first substantially planar structure operatively attached to said first and second backing members and spanning therebetween for spacing the second end of the first backing member a predetermined distance from the first end of the second backing member and such that the front side of the first backing member and the front side of the second backing member generally lie along a first plane, the first substantially planar structure being disposed in a plane substantially parallel to said first plane and overlapping at least a portion of said second end of said first backing member and at least a portion of said first end of said second backing member, whereby the first backing member is placed between a first upright stud having a side disposed in a plane that is substantially similar to said first plane and a second upright stud having a side disposed in a plane that is substantially similar to said first plane, the second upright stud spaced from the first upright stud and whereby the second backing member can be disposed between the second upright stud and a third upright stud spaced from the second upright stud such that the second end of the first backing member is adjacent to and on one side of the second upright stud and the first end of the second backing member is adjacent to and on another side of the second upright stud and wherein the predetermined distance is approximately the width of a portion of the second upright stud.

37. The apparatus of claim 36 further comprising:
a third backing member having a first end and a second end; and
a second substantially planar structure operatively attached to the second and third backing members for spacing the second end of the second backing member a predetermined distance from the first end of the third backing member whereby the second backing member can be placed between the second upright stud and the third upright stud such that the third backing member can be disposed between the third upright stud and a fourth upright stud spaced from the third upright stud and whereby the second end of the second backing member is adjacent to and on one side of the third upright stud and the first end of the third backing member is adjacent to and on another side of the third upright stud.

38. The apparatus of claim 37 wherein the second substantially planar structure is comprised of metal.

39. The apparatus of claim 37 wherein the first, second and third backing members are constructed of wood.

40. The apparatus of claim 36 wherein the first substantially planar structure is comprised of metal.

41. The apparatus of claim 36 wherein the first and second backing members are constructed of wood.

42. The apparatus of claim 36 wherein sheet rock is attached to the upright studs adjacent to a front side thereof of each of the first and second backing members, thereby covering the first and second upright studs and the front sides of the first and second backing members.

43. The apparatus of claim 36 wherein the first and second upright studs are made of metal.

44. The apparatus of claim 43 wherein the first and second upright studs are U-shaped.

45. The apparatus of claim 43 wherein the metal is galvanized steel.

46. The apparatus of claim 36 wherein at least one of the upright studs is constructed of metal.

47. A wall comprising:
a first upright stud having a side disposed in first plane;
a second upright stud to one side of and spaced from the first stud having a side disposed in said first plane;
a third upright stud to one side of and spaced from the second stud having a side disposed in said first plane;
a first backing member disposed between the first and second studs, said first backing member having a front planar surface on a front side thereof
a second backing member disposed between the second and third studs, said second backing member having a front planar surface on a front side thereof, said front planar surface disposed in a plane that is substantially similar to said first plane; and
a first substantially planar structure operatively attached to the first and second backing members and spanning therebetween, said first substantially planar structure further being attached to at least one of the first, second or third upright studs and being disposed in a plane substantially parallel to the plane of said front planar surface of the first and second backing members and at least overlapping at least a portion of said second end of said first backing member and at least a portion of said first end of said second backing member.

48. The wall of claim 47 further comprising:

a fourth upright stud to one side of and spaced from the third stud;

a third backing member disposed between the third and fourth upright studs; and a second substantially planar structure operatively attached to the second and third backing members and being further attached to at least one of the third and fourth upright studs.

49. The wall of claim 48 wherein the second substantially planar structure is attached to the third stud.

50. The wall of claim 48 wherein the second substantially planar structure is also attached to the fourth stud.

51. The wall of claim 47 wherein the first substantially planar structure is attached to the second stud.

52. The wall of claim 51 wherein the first substantially planar structure is also attached to the first stud.

53. The wall of claim 47 wherein at least one of the upright studs is constructed of metal.

54. A wall comprising:

a first upright stud having a side disposed in a first plane;

a second upright stud having a side disposed in said first plane spaced in relation to the first upright stud to define a first space therebetween;

a third upright stud having a side disposed in said first plane supported in spaced relation to the second upright stud to define a second space therebetween;

a fourth upright stud having a side disposed in said first plane supported in spaced relation to the third upright stud to define a third space therebetween;

a first backing member sized to be received in the first space and extend between the first and second upright studs, said first backing member having a front planar surface on a front side thereof, said front planar surface disposed in a plane that is substantially similar to said first plane;

a second backing member sized to be received in the second space and extend between the second and third upright studs, said second backing member having a front planar surface on a front side thereof, said front planar surface disposed in a plane that is substantially similar to said first plane;

a third backing member sized to be received in the third space and extend between the third and fourth upright studs; and a substantially planar spacer attached to the first, second and third backing members and at least one of the first, second, third, and fourth upright studs such that the first backing member is supported in the first space and the second backing member is supported in the second space and the third backing member is supported in the third space, said substantially planar spacer being disposed in a plane substantially parallel to the plane of said front planar surface of the first and second backing members.

55. The wall of claim 54 wherein the spacer member is attached to each of the first, second, third and fourth upright studs.

56. The wall of claim 54 wherein at last one of the upright studs is constructed of metal.

* * * * *